US012791369B2

(12) United States Patent
Sulzer et al.

(10) Patent No.: US 12,791,369 B2
(45) Date of Patent: Nov. 10, 2026

(54) MEASURING DEVICE AND METHOD FOR DETERMINING AN ABRASION

(71) Applicant: Endress+Hauser Flowtec AG, Reinach (CH)

(72) Inventors: Thomas Sulzer, Basel (CH); Florent Tschambser, Hesingue (FR); Werner Wohlgemuth, Seewen (CH); Lars Dreher, Ballrechten Dottingen (DE)

(73) Assignee: Endress+Hauser Flowtec AG, Reinach (CH)

( * ) Notice: Subject to any disclaimer, the term of this patent is extended or adjusted under 35 U.S.C. 154(b) by 343 days.

(21) Appl. No.: 18/257,596

(22) PCT Filed: Nov. 26, 2021

(86) PCT No.: PCT/EP2021/083205

§ 371 (c)(1),
(2) Date: Jun. 15, 2023

(87) PCT Pub. No.: WO2022/128414

PCT Pub. Date: Jun. 23, 2022

(65) Prior Publication Data

US 2024/0110819 A1 Apr. 4, 2024

(30) Foreign Application Priority Data

Dec. 15, 2020 (DE) ..................... 10 2020 133 612.8

(51) Int. Cl.
*G01F 1/58* (2006.01)

(52) U.S. Cl.
CPC ................ *G01F 1/584* (2013.01); *G01F 1/58* (2013.01)

(58) Field of Classification Search
CPC .................................. G01F 1/58; G01F 1/584
USPC ...................................................... 73/861.12
See application file for complete search history.

(56) References Cited

U.S. PATENT DOCUMENTS

| | | | |
|---|---|---|---|
| 4,338,097 | A | 7/1982 | Turner et al. |
| 4,513,624 | A | 4/1985 | Mchale et al. |
| 6,946,855 | B1 | 9/2005 | Hemblade |
| 9,228,867 | B2 | 1/2016 | Clarke et al. |
| 9,410,830 | B2 | 8/2016 | Rovner et al. |

(Continued)

FOREIGN PATENT DOCUMENTS

| | | | |
|---|---|---|---|
| CN | 102057257 | A | 5/2011 |
| CN | 104823027 | A | 8/2015 |

(Continued)

*Primary Examiner* — Peter J Macchiarolo
*Assistant Examiner* — John M Royston
(74) *Attorney, Agent, or Firm* — Kelly J. Smith; Endress+Hauser (USA) Holding, Inc.

(57) ABSTRACT

The present disclosure relates to a measuring device including a measuring pipe for conducting a flowable medium. The measuring pipe has an inner lateral surface designed to be, at least in portions, electrically insulating, and at least one monitoring electrode. The at least one monitoring electrode is arranged on the electrically insulating portion of the inner lateral surface in a medium-contacting manner. The measuring device also includes a measuring apparatus for determining a process property of the medium, and an abrasion detection device which is designed to determine at least one variable corresponding to an abrasion of the at least one monitoring electrode.

6 Claims, 3 Drawing Sheets

(56) References Cited

U.S. PATENT DOCUMENTS

| | | | | |
|---|---|---|---|---|
| 2010/0326654 | A1 | 12/2010 | Hemblade | |
| 2015/0240627 | A1 | 8/2015 | Gao et al. | |
| 2017/0115146 | A1* | 4/2017 | Shi | G01F 25/10 |
| 2020/0018627 | A1* | 1/2020 | Arai | G01F 1/60 |
| 2022/0074768 | A1* | 3/2022 | Brockhaus | G01F 1/584 |

FOREIGN PATENT DOCUMENTS

| | | | | |
|---|---|---|---|---|
| CN | 110455705 | A | | 11/2019 |
| CN | 209589142 | U | | 11/2019 |
| DE | 10128607 | A1 | | 1/2003 |
| DE | 102004062680 | A1 | | 6/2006 |
| DE | 102005044972 | A1 | | 3/2007 |
| DE | 102010056077 | A1 | | 6/2012 |
| DE | 102018114180 | A1 | | 12/2019 |
| EP | 0766069 | B1 | | 7/2005 |
| EP | 3460451 | A2 | | 3/2019 |
| GB | 2501184 | A | | 10/2013 |
| JP | 2006250692 | A | * | 9/2006 |
| WO | 2009071615 | A2 | | 6/2009 |
| WO | 2009071615 | A3 | | 6/2009 |
| WO | 2010066518 | A1 | | 6/2010 |
| WO | 2016102168 | A1 | | 6/2016 |

* cited by examiner

MEASURING DEVICE AND METHOD FOR DETERMINING AN ABRASION

CROSS-REFERENCE TO RELATED APPLICATIONS

The present application is related to and claims the priority benefit of DPMA Patent Application No. 10 2020 133 612.8, filed on Dec. 15, 2020 and International Patent Application No. PCT/EP2021/083205, filed on Nov. 26, 2021, the entire contents of which are incorporated herein by reference.

TECHNICAL FIELD

The invention relates to a measuring device, a process plant and a method for determining an abrasion.

BACKGROUND

Measuring devices which are used to monitor process properties of the medium are known from process automation. Typical process properties are, for example, flow volume and rate, mass flow, pH value, pressure and temperature of the medium. One example of a frequently used measuring device is a magnetic-inductive flow meter. Depending on the application, the medium for the measuring pipe can have abrasive properties. In order to ensure a possible long operating time of the measuring device, special housings, measuring pipe bodies or linings for the measuring pipe are provided. When using linings, a replacement can be provided by the user in case of increased abrasion. It can be advantageous to determine the time at which the replacement of the lining is required without interrupting the process.

Magnetic-inductive flowmeters are used for determining the flow rate and the volumetric flow of a flowing medium in a pipeline. A magnetic-inductive flow meter has a magnet system that generates a magnetic field perpendicular to the direction of flow of the flowing medium. Single coils are typically used for this purpose; permanent magnets less frequently. In order to realize a predominantly homogeneous magnetic field, pole shoes are additionally formed and attached to the measuring pipe, such that the magnetic field lines run over the entire pipe cross-section substantially perpendicularly to the transverse axis or in parallel to the vertical axis of the measuring pipe. A measurement electrode pair attached to the lateral surface of the measuring pipe taps an electrical measurement voltage or potential difference in the medium which is applied perpendicularly to the direction of flow and to the magnetic field and occurs when a conductive medium flows in the direction of flow when the magnetic field is applied. Since, according to Faraday's law of induction, the tapped measurement voltage depends on the velocity of the flowing medium, the flow rate u and, with the aid of a known pipe cross-section, the volumetric flow V can be determined from the induced measurement voltage U.

Magnetic-inductive flow meters are often used in process and automation engineering for fluids, as of an electrical conductivity of approximately 5 μS/cm. Corresponding flow meters are sold by the applicant in a wide variety of embodiments for various fields of application, for example under the name PROMAG.

Due to the high mechanical stability required for measuring pipes of magnetic-inductive flow meters, said pipes usually consist of a metallic carrier tube of predeterminable strength and width, which is lined internally with an electrically insulating material of predeterminable thickness, the so-called liner. For example, DE 10 2005 044 972 A1 and DE 10 2004 062 680 A1 each describe magnetic-inductive measuring sensors which comprise a measuring sensor, which can be inserted into a pipeline and comprise an inlet-side first end and an outlet-side second end, with a non-ferromagnetic carrier tube as an outer sheath of the measuring pipe, and a tubular lining, which is accommodated in a lumen of the carrier tube and consists of an electrically insulating material, for conducting a flowing process medium which is electrically insulated from the carrier tube.

The lining, which is typically made of a thermoplastic, thermosetting and/or elastomeric plastic, serves, inter alia, for chemical insulation of the support tube from the process medium. In magnetic-inductive measuring sensors, in which the carrier tube has a high electrical conductivity, for example, when using a metallic carrier tube, the lining is also used for electrical insulation between the carrier tube and the process medium, which prevents short circuiting of the voltage induced in the process medium via the carrier tube. A corresponding design of the support tube thus makes it possible to adapt the strength of the measuring pipe to the mechanical stresses present in the respective case of use, while by means of the lining an adaptation of the measuring pipe to the electrical, chemical and/or biological requirements applicable for the respective case of use can be realized.

A so-called support body, which is embedded in the lining, is frequently used for fastening the lining. In the patent specification EP 0 766 069 B1, for example, a perforated tube welded to the carrier tube serves as a support body. The support body is connected to the carrier tube and embedded in the lining by applying the material from which the lining is made, internally in the carrier tube. Furthermore, a measuring pipe with a metal housing has become known from patent specification U.S. Pat. No. 4,513,624 A for mechanical stabilization and for electrical shielding. For this purpose, the metal housing surrounds a pipeline leading to the medium.

Furthermore, magnetic-inductive flow meters which have a measuring pipe body formed from an electrically insulating material, for example plastic, ceramic and/or glass are known. With such measuring pipes, an insulating coating is forgone.

It has been shown that the electrically insulating lining, but also the measuring pipe body formed from an electrically insulating material, is subject to erosion despite the use of durable materials. In particular, process media carrying solid particles, e.g., sand, gravel and/or stones, cause an abrasion of the lining of the pipeline or the measuring pipe body. The abrasion or deformation of the lining or of the electrically insulating measuring pipe body causes the flow profile of the measuring sensor to change. As a result, the measuring device delivers faulty measured values for the volume or mass flow. In addition, the chemical or electrical insulation between the process medium and the carrier tube is lost when measuring pipes have an internal lining.

WO 2010/066518 A1 discloses a measuring device for determining a volumetric and/or mass flow of a process medium flowing through a measuring pipe. The measuring pipe comprises a carrier tube with an internal lining, comprising a first layer and a second layer, and a monitoring electrode embedded between the first layer and the second layer and configured to detect damage to the second/first layer. However, the disadvantage of this is the influencing of the monitoring on the measurement of the volume flow and/or mass flow.

SUMMARY

The problem addressed by the present disclosure is that of providing an alternative measuring device and an alternative method for determining abrasion, which remedy the problem.

The problem is solved by the measuring device and the method according to the present disclosure.

The measuring device according to the invention comprises:

- a measuring pipe for guiding a flowable medium,
  - wherein the measuring pipe has an inner lateral surface,
  - wherein the inner lateral surface is designed to be, at least in portions, electrically insulating,
- at least one monitoring electrode,
  - wherein the at least one monitoring electrode is arranged on the electrically insulating portion of the inner lateral surface in a medium-contacting manner;
- an abrasion detection device which is designed to determine at least one variable on the at least one monitoring electrode, said variable corresponding to an abrasion of the monitoring electrode.

Known monitoring electrodes are metallic foils embedded in the liner or pin electrodes on which a measuring circuit of the abrasion detection device measures an electrical resistance against a medium-contacting reference electrode. According to the invention, the monitoring electrode is medium-contacting and thus directly exposed to the abrasive medium.

An abrasion detection device refers to a device which is designed to determine or measure values of the variable to be determined (e.g., electrical resistance, current, voltage, or variables dependent thereon) at the monitoring electrode. This can take place with or without contact.

Advantageous embodiments of the invention are the subject matter of the dependent claims.

One embodiment provides that the at least one monitoring electrode is designed as a selectively applied, at least partially conductive, layer system,

- wherein the layer system comprises at least one conductive polymer layer and/or at least one metal layer and/or at least one doped semiconductor layer.

The layer system is preferably designed as a thin film and can have layer thicknesses of several nanometers up to a few millimeters. Such thin layer systems have the advantage that their variable, in particular the electrical resistance, determined by means of the abrasion detection device depends directly on the change in layer thickness and thus also indirectly on the abrasion by the medium.

One embodiment provides that the layer system comprises at least two electrically conductive layers, each having different materials.

The layer materials used are preferably stainless steels, CrNi alloys, ZnAl alloys, platinum, or titanium. For a multiplicity of applications, stainless steels 1.4435 and 1.4462 are used. The use of at least two layers with different materials has the advantage that abrasion rates for different materials can be derived on the basis of the determined variable. Accordingly, the abrasion detection device is designed to determine a first abrasion rate for the first layer and a second abrasion rate for the second layer. In this case, the second abrasion rate is only determined when the first layer is removed and the values of the determined variable deviate from a target value range.

One embodiment provides that the at least two layers each have an electrical resistance,

- wherein the at least two layers are arranged such that the respective electrical resistances decrease in the radial direction, in particular in the direction of a measuring pipe center point.

This has the advantage that an abrasion rate can be determined on the basis of the temporal electrical resistance change. If the layer system is intact, the current flow dominates through the layer with the lower resistance. The removal of this layer is reflected in the values of the variable to be determined. Abrasion rate refers to a material-specific variable which provides information on the removal—expressed by a length, an surface or a volume—per time. Based on the abrasion rate, the time for replacing medium-contacting measuring device components, such as liners or measuring electrodes, can be determined. The different electrical resistances can be set by the selection of materials having different specific resistances or by layers having different layer thicknesses.

One embodiment provides that the at least two layers each have a layer thickness,

- wherein the at least two layers are arranged such that the respective layer thicknesses increase in the radial direction, in particular in the direction of a measuring pipe center point.

Therefore, it is also possible to realize layer systems with layers of a soft and thus rapidly removable layer material, such as polymers which have a higher electrical conductivity than thinner metallic layers.

One embodiment provides that the at least two layers each have a hardness,

- wherein the at least two layers are arranged such that the respective hardnesses decrease in the radial direction, in particular in the direction of a measuring pipe center point.

This has the advantage that hardness-specific abrasion rates can be determined, from which maintenance periods for other measuring device components made from materials with a similar hardness can be inferred. The term hardness stands for a mechanical resistance which counteracts a material of a mechanical penetration of another body, namely the substances causing the abrasion in the flowing medium. Depending on the type of influence, a distinction is made between different types of hardness. Therefore, hardness is not only the resistance to harder bodies, but also to softer and equally hard bodies. Hardness is also a measure of the wear behavior of materials.

One embodiment provides that the layer system has at least one electrically insulating layer, which separates two electrically conductive layers of the at least two layers from one another.

Effects due to inhomogeneous abrasion can thus be prevented. If the electrical contact of one of the contacting means with the first layer is broken, only the electrical resistance of the second layer is measured. This is substantially constant until the insulating layer is removed. Only when the second layer is removed—and the insulating layer is thus at least partially removed—does the electrical resistance of the layer system change in turn. This can be used for the separation of the different abrasion rates of the individual layers.

One embodiment provides that a layer of the layer system contacting the inner lateral surface is designed to be at least partially annular and/or has an electrical resistance $R_1$ with $R_1 \leq 10^{-6}$ Ωm, in particular $R_1 \leq 5 \cdot 10^{-7}$ Ωm and preferably $R_1 \leq 10^{-7}$ Ωm.

This has the advantage that the monitoring electrode is simultaneously suitable for grounding the medium to be conducted, which is particularly advantageous for magnetic-inductive flow meters, with which lack of grounding leads to the displacement of the measuring point.

One embodiment provides that the abrasion detection device is designed to measure the at least one variable in a first time interval, wherein the abrasion detection device is designed to connect the layer system to a ground potential at least in a second time interval.

One embodiment provides that the abrasion detection device has a contacting arrangement for electrically contacting the monitoring electrode, in particular comprising a first contacting means and a second contacting means, wherein the abrasion detection device is designed to measure an impedance, in particular an electrical resistance, on the at least one monitoring electrode, and to determine the at least one variable at least on the basis of the impedance, in particular on the basis of the temporal change of the impedance.

One embodiment provides that the contacting arrangement has a first contacting means and a second contacting means, wherein the contacting arrangement has a third contacting means and a fourth contacting means, wherein the third contacting means and the fourth contacting means are arranged in particular in a circumferential direction of the measuring pipe between the first contacting means and the second contacting means, wherein the abrasion detection device is designed to allow an electrical current to flow between the first contacting means and the second contacting means, wherein the abrasion detection device is designed to measure an electrical voltage between the third contacting means and the fourth contacting means, wherein the abrasion detection device is designed to determine a sheet resistance and to determine the at least one variable at least on the basis of the sheet resistance, in particular on the basis of the temporal change of the sheet resistance.

Such a configuration has the advantage that contact resistances between the contacting means and the layer system are reduced and thus very small changes in the electrical resistance of the layer system are also detectable.

One embodiment provides that one variable of the at least one variable describes a material-dependent abrasion rate and preferably a further variable of the at least one variable describes a further material-dependent abrasion rate.

If only material-dependent or hardness-dependent abrasion rates are known, the determination of the maximum running time up to the replacement of further components used in the measuring device or in the process plant is possible.

Process plant according to the invention, comprising:

a pipeline, a measuring device according to the invention, wherein the measuring device is connected to the pipeline, wherein the monitoring electrode has an electrode material and/or a coating material arranged on the inner lateral surface, wherein one variable of the at least one variable is specific to the electrode material and/or the coating material, a plant component which, at least in a medium-contacting portion, also has the electrode material and/or the coating material, a monitoring device, wherein the monitoring device is designed to output a warning for the plant component and/or to determine a remaining operating time up to a maintenance measure of the plant component at least on the basis of the variable and preferably on the basis of a threshold value assigned to the plant component.

A method according to the invention for determining an abrasion of a medium-contacting, electrically insulating coating of a measuring pipe of a measuring device, in particular of a measuring device according to the invention, comprises the method steps:

measuring a sheet resistance on a, in particular medium-contacting, monitoring electrode, wherein the monitoring electrode is designed as a layer system;

determining a test variable, dependent on a layer thickness of the layer system, by means of the measured sheet resistance, determining whether abrasion is present on the basis of the test variable.

The invention is suitable for thin-film electrodes, the electrical resistance of which depends on the layer thickness. Even if the layer thickness changes only minimally, the measured resistance is affected. An abrasion rate can be derived on the basis of the temporal change in resistance.

BRIEF DESCRIPTION OF THE DRAWINGS

The present disclosure is explained in greater detail with reference to the following figures. The following are shown.

DETAILED DESCRIPTION

Figure 1:
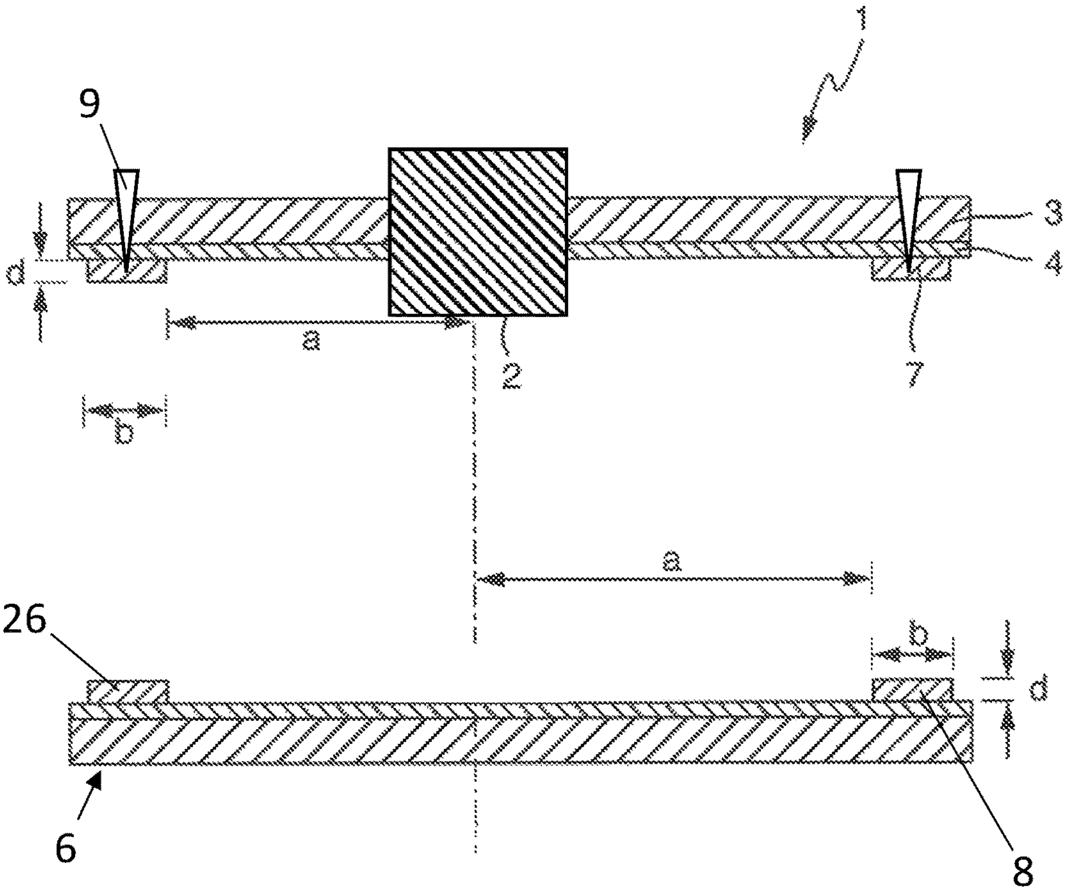
FIG. 1 shows a longitudinal section of a measuring device according to the present disclosure.

FIG. 1 shows a longitudinal section of a measuring device 1 according to the invention. The measuring device 1 shown comprises a measuring pipe 6 for conducting a flowable medium. The measuring pipe 6 consists of a metallic carrier tube 3 and a liner 4 made of an electrically insulating material such as, for example, plastic. The liner 4 is used to insulate the carrier tube 3 against the medium. By means of the liner 4 applied to an inner surface of the carrier tube 3, the inner lateral surface 20 of the carrier tube 3 is designed to be, at least in portions, electrically insulating. Furthermore, the measuring device 1 has two monitoring electrodes 7, 26, which extend in a medium-contacting and annular manner on the electrically insulating portion of the inner lateral surface 20 medium on the input and output side. A measuring apparatus 2 for determining a process property of the medium to be conducted is part of the measuring device 1. An abrasion detection device 9 is designed to determine at least one variable on one of the two monitoring electrodes 7, 26, which corresponds to an abrasion of the monitoring electrode 7. Alternatively, the abrasion detection device 9 can be connected to both monitoring electrodes 7, 26, wherein one of the two values of the determined variable can serve as a reference value. The abrasion detection device 9 is designed to determine a sheet resistance of the monitoring electrode 7 and to determine the at least one variable at least on the basis of the sheet resistance, in particular on the basis of the temporal change of the sheet resistance. The metallic carrier tube 3 is electrically insulated from the abrasion detection device 9. The determined variable is a material-dependent abrasion rate which stands for the specific material of the two monitoring electrodes 7, 26. The two monitoring electrodes 7 are each designed as a selectively applied conductive layer system 8, wherein the layer system 8 comprises at least one conductive polymer layer and/or at least one metal layer and/or at least one doped semiconductor layer. In addition, the layer system 8 has a width b and thickness layer system thickness d which, in addition to the material-dependent specific resistance, are decisive for the size of the sheet resistance of the layer system 8. The abrasion detection device 9 can also be designed to measure the at least one variable in a first time interval and to connect it to a ground potential in a second time interval. In addition to detecting abrasion by the medium, the monitoring electrode 7, 26 thus is also used to connect the flowable medium to a controlled potential.

Figure 2:
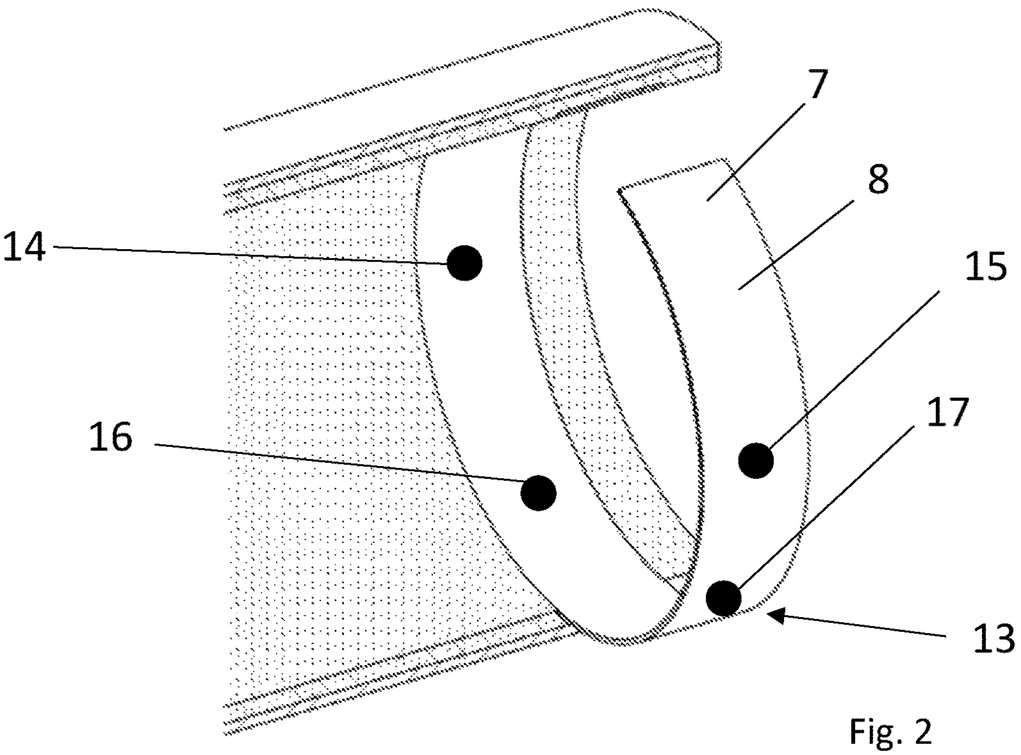
FIG. 2 shows a perspective view of a partially sectioned embodiment of the measuring device according to the present disclosure.

FIG. 2 shows a perspective view of a partially sectioned embodiment of the measuring device 1 according to the invention. The monitoring electrode 7 shown is designed to be annular and consists of a layer system 8 having a conductive layer 11. The ring can be designed to be closed or open. The contacting arrangement 13 has a first contacting means 14, a second contacting means 15, a third contacting means 16 and a fourth contacting means 17. In this case, the third contacting means 16 and the fourth contacting means 17 are arranged in a circumferential direction of the measuring pipe 6 between the first contacting means 14 and the second contacting means 15. The contacting means 14, 15, 16, 17 are evenly distributed around the circumference of the measuring pipe. The adjacent contacting means each have a substantially identical distance from one another, wherein the distance is in each case greater than the thickness of the layer system 8. The abrasion detection device 9 is designed to allow an electrical current to flow between the first contacting means 14 and the second contacting means 15 and to measure an electrical voltage between the third contacting means 16 and the fourth contacting means 17. A sheet resistance for the monitoring electrode 7 is obtained on the basis of the magnitude of the electrical current and the measured voltage. The at least one variable can be determined at least on the basis of the sheet resistance, in particular on the basis of the temporal change of the sheet resistance.

Figure 3:
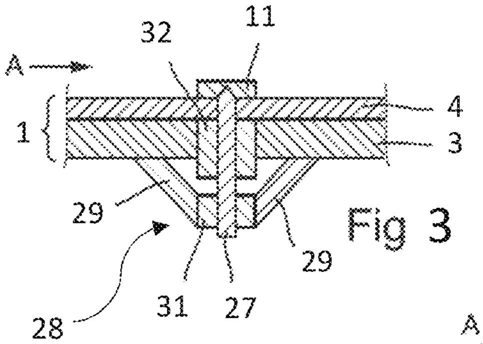
FIG. 3 shows a section of a longitudinal section of an embodiment of the measuring device according to the present disclosure.

FIG. 3 shows a section of a longitudinal section of an embodiment of the abrasion detection device 9 of the measuring device according to the invention. In this variant, the liner 4 can have a size of less than 2.5 mm, preferably less than 1.5 mm. For example, a liner as a coated comparatively thin material can also be introduced into the carrier tube 3. Alternatively, the liner can also be a lacquer layer or designed to be a plasma coating. Particularly advantageously, the liner thickness of the liner 6 can be from 50 μm to 1.5 mm, in particular from 200 μm to 1.3 mm. On the side facing the medium, the measuring pipe 2 has an electrically conductive layer 10. It can preferably be a metallic coating. The electrically conductive layer 11 can preferably be applied as an electrically conductive lacquer, as an electrically conductive powder coating and/or as an electrically conductive plasma coating. Preferred layer thicknesses for the electrically conductive layer are between 40 μm and 1 mm, preferably between 50 μm and 800 μm. These layer thicknesses ensure that the layer is sufficiently stable even under mechanical influence and that a contacting means of the measuring-pipe side can be contacted. The contacting means is shown in FIG. 3 as a tapered pin electrode 27. Of course, other electrode forms can also be realized within the scope of the present invention, wherein this electrode form has proven to be particularly suitable for contact with the metallic coating. In the case of plastic measuring pipes, an electrode form as in WO 2009/071615 A1, which does not require an additional anchoring device, can alternatively also be used. In terms of manufacturing technology, the pin electrode 27 can be inserted through a bore in the measuring pipe 1 or only in the carrier tube 3 until it makes contact with the electrically conductive layer 11 from the outside, i.e., beyond the lumen of the measuring pipe 1. It is also possible and easily realized to initially position the pin electrode 27 and then apply the electrically conductive layer 11. An electrically insulating inner liner 32 is provided in the bore of the measuring pipe 1 or of the carrier tube 3 of the measuring pipe 1, advantageously preventing contact between the metallic carrier tube 3 and the pin electrode 27. The electrically conductive layer 11 can be used in any type of measuring pipe but is particularly advantageous in measuring pipes with a small internal diameter (DN100 or less) and in measuring pipes with a cross section reduced and/or changed in the region of the magnet system, as described, for example, in WO 2016/102168 A1. An anchoring system 28 for the pin electrode 27 is provided on the side of the measuring pipe 1 facing away from the medium. It comprises two arms 29, which protrude obliquely from the outer wall of the measuring pipe 1 and are converging toward one another, and a platform 31 which serves radially at a distance from the outer wall of the measuring pipe and has a bore for the passage of the pin electrode 27. This form of the anchoring system 28 can also be used as a centering aid and as a stop when providing the bore for the electrode in the carrier tube 3, so that a drill is guided and sets the bore at a defined height. Furthermore, the anchoring system 28 is used to prevent rotation of the pin electrode 27. Further bonding layers can be provided between the electrically conductive layer 11 and the measuring pipe 1. However and advantageously, the electrically conductive layer 11 can also be applied directly to the inner side of the measuring pipe 1, in particular to the surface of the liner 4. The electrically conductive layer 11 is location-selective. The material of the electrically conductive layer 11 can preferably be steel but also another corrosion-resistant metal. Particular preference is given to using stainless steel of class 1.4435, which is approved for drinking water applications. The arms 29 of the anchoring system 28 can be welded to the carrier tube 3.

Figure 4:
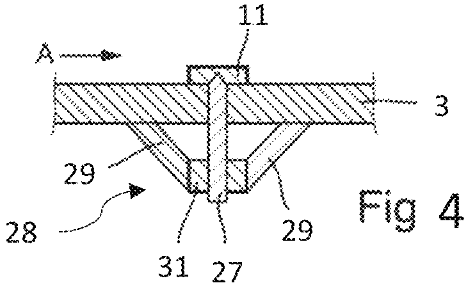
FIG. 4 shows a section of a longitudinal section of a further embodiment of the measuring device according to the present disclosure.

FIG. 4 shows a section of a longitudinal section of a further embodiment of the abrasion detection device of the measuring device according to the invention. FIG. 4 shows a modified exemplary embodiment of a carrier tube 3 made of plastic. Therefore, it does not require a liner and no electrically insulating bore lining. The electrically conductive layer 11, the pin electrode 27, and the anchoring system 28 can be designed analogously to FIG. 3.

Figure 5:
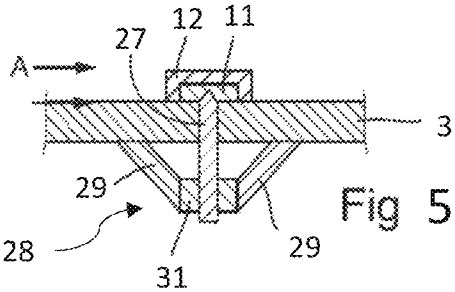
FIG. 5 shows a section of a longitudinal section of a further embodiment of the measuring device according to the present disclosure.

FIG. 5 shows a section of a longitudinal section of a further embodiment of the abrasion detection device of the measuring device according to the invention. The electrode variant has a first conductive layer 11 and a second conductive layer 12 which covers, preferably completely, the first conductive layer 12 towards the medium. The material of the first conductive layer 11 differs from the material of the second layer 12 in terms of its conductivity. The second layer 19 can consist, e.g., of a more corrosion-resistant material than the first layer 11. For example, steel, in particular stainless steel, for example, material class 1.4435 for the drinking water application, can be used as the material of the second layer 12 and copper, a conductive plastic or a conductive semiconductor can be used as the material of the first layer 11. Once again, the removal of the second layer 12 can be monitored, e.g., by changing a resistance value, and imminent failure can be indicated. Nevertheless, the measuring function of the electrode in this case also remains intact due to the presence of the first layer 11. Location-selective direct coatings can be applied, e.g., in a plasma coating process, and are already known, inter alia, from ecoCOAT GmbH. By means of a layer applied in this way, an electrode surface can be created, which projects only to a negligibly small extent into the lumen of a pipe, in particular of a measuring pipe, of a magnetic-inductive flow meter. As a result, turbulences or the like on the electrode surface are reduced or even completely prevented. In addition, a small liner thickness can be selected in the case of measuring pipes with metallic carrier tubes, since the electrode heads have previously been partially pressed into liner material to avoid turbulences, which requires a specific liner thickness which is now no longer necessary. The pin electrode 27 and the anchoring system 28 can be designed analogously to FIG. 3.

Figure 6:
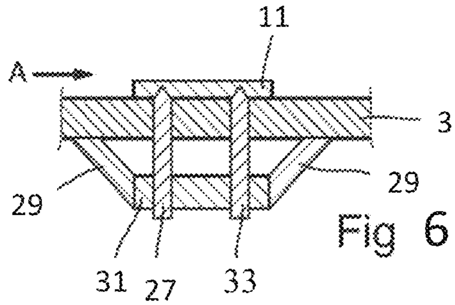
FIG. 6 shows a section of a longitudinal section of a further embodiment of the measuring device according to the present disclosure.

FIG. 6 shows a section of a longitudinal section of a further embodiment of the abrasion detection device of the measuring device according to the invention. Two pin electrodes 27 and 33 are arranged one behind the other in the flow direction A in the electrically conductive layer 11 and in the measuring pipe. If the front or the inflow-side region of the layer 11 is removed, such removal can be detected by a comparison measurement of the voltages and/or resistances of the respective electrodes 27 and 33 relative to a reference electrode, and an imminent failure can be signaled. In this case, a repair can take place in a relatively uncomplicated manner in that the inner side of the carrier tube 3 is simply coated again in a location-selective manner.

Figure 7:
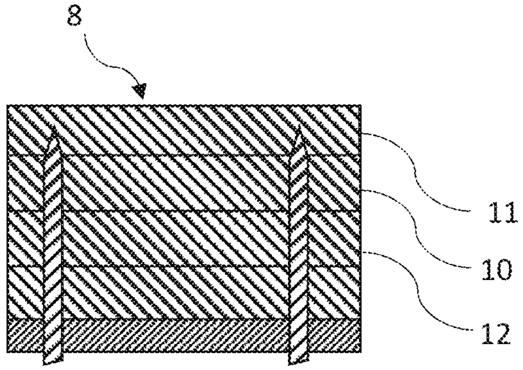
FIG. 7 shows a section of a longitudinal section of a further embodiment of the measuring device according to the present disclosure.

FIG. 7 shows a section of a longitudinal section of a further embodiment of the abrasion detection device 9 of the measuring device according to the invention. The layer system 8 consists of four individual layers each having a different electrical resistance, wherein the electrical resistances are selected such that they decrease in the radial direction, in particular in the direction of a measuring pipe center point. Alternatively, individual layers can each have different hardnesses, wherein the hardnesses decrease in the radial direction, in particular in the direction of a measuring pipe center point. Alternatively, the layers can each have different thicknesses, wherein the layer thicknesses are selected such that they increase in the radial direction, in particular in the direction of a measuring pipe center point. In addition to the electrically insulating layers, the layer system 8 comprises at least one electrically insulating layer 10, which separates two electrically conductive layers 11, 12 from one another.

Figure 8:
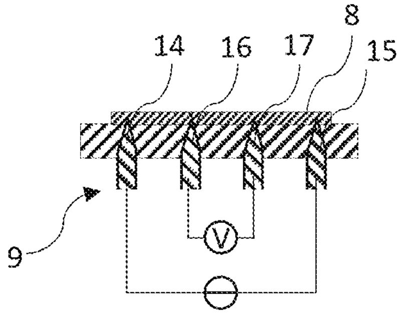
FIG. 8 shows a section of a longitudinal section of a further embodiment of the measuring device according to the present disclosure.

FIG. 8 shows a section of a longitudinal section of a further embodiment of the abrasion detection device 9 of the measuring device according to the invention. It is an alternative to the embodiment according to FIG. 2 with contacting means distributed on the carrier tube circumference. The contacting means 14, 15, 16, 17 are evenly distributed in the flow direction. The layer system is not necessarily designed as a ring strip; instead, the adjacent contacting means can each have a substantially identical distance from one another, wherein the distance is in each case greater than the thickness of the layer system 8. The abrasion detection device 9 is designed to allow an electrical current to flow between the first contacting means 14 and the second contacting means 15 and to measure an electrical voltage between the third contacting means 16 and the fourth contacting means 17. A sheet resistance for the layer system is obtained depending on the magnitude of the electrical current and the measured voltage. The at least one variable can be determined at least on the basis of the sheet resistance, in particular on the basis of the temporal change of the sheet resistance.

Figure 9:
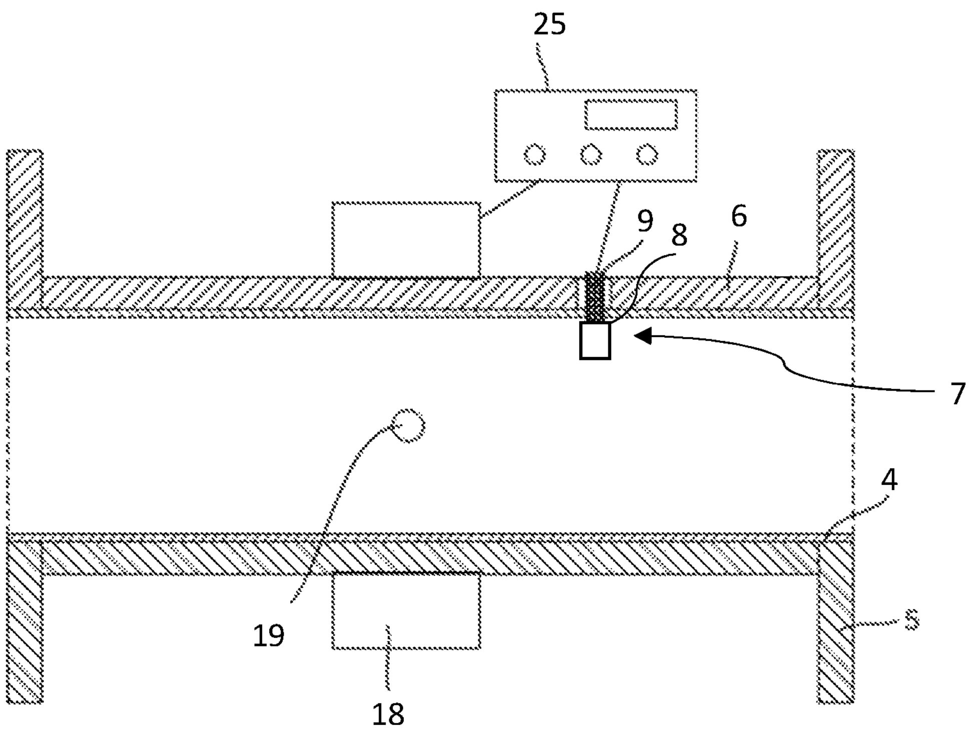
FIG. 9 shows a longitudinal section of a magnetic-inductive flow meter.

FIG. 9 shows a longitudinal section of a magnetic-inductive flow meter according to the invention which can be connected via flanges 5 to a process line. The measuring apparatus of the magnetic-inductive flow meter has a magnetic field generating apparatus 18 for generating a magnetic field penetrating the measuring pipe 6, which is arranged on an outer lateral surface of the measuring pipe 6. The magnetic field generating apparatus 18 can comprise, e.g., at least one saddle coil or at least one coil having a pole shoe. In addition, the measuring apparatus has an electrode arrangement 19 for tapping a flow-rate-dependent measured variable inductively generated in the medium. It generally consists of at least two diametrically arranged measuring electrodes. The electrode arrangement 19 is arranged in a measuring portion and a monitoring electrode 7 is applied in the flow direction offset to the measuring portion on the liner 4 as a layer system 8. The layer system 8 is connected via an abrasion detection device 9 to a measuring circuit which is designed to carry out the method according to the invention. The monitoring electrode 7, the abrasion detection device 9 and the measuring circuit together form the monitoring device 25.

Figure 10:
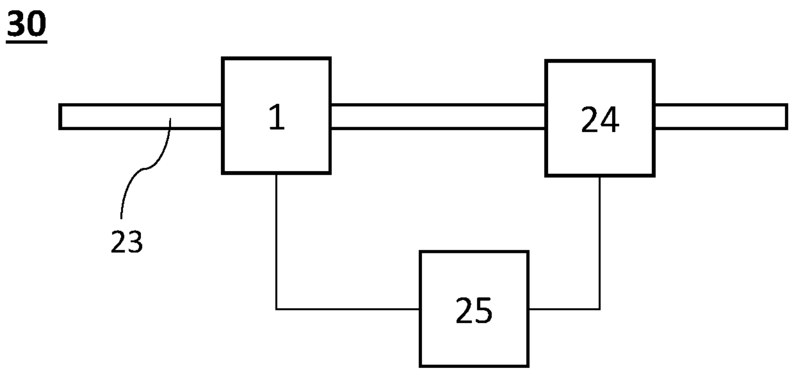
FIG. 10 shows a view of a part of a process plant.

FIG. 10 shows a view of a part of a process plant 30 comprising a pipeline 23, a measuring device 1 according to the invention, a plant component 24 and a monitoring device 25. The measuring device 1 is connected to the pipeline 23 and has a monitoring electrode, which has an electrode material and/or a coating material similar to the plant component 24. The monitoring device 25 is designed to output a warning for the plant component 24 and/or to determine a remaining operating time up to a maintenance measure of the plant component 24 at least on the basis of at least one variable specific for the electrode material and/or the coating material and preferably on the basis of a threshold value assigned to the plant component 24.

The invention claimed is:

1. A measuring device comprising:

a measuring pipe for conducting a flowable medium;

wherein the measuring pipe has an inner lateral surface;

wherein the inner lateral surface is designed to be electrically insulating;

at least one monitoring electrode;

wherein the at least one monitoring electrode is arranged on the electrically insulating portion of the inner lateral surface in a medium-contacting manner;

a measuring apparatus for determining a process property of the medium; and an abrasion detection device which is designed to determine at least one variable on the at least one monitoring electrode, said variable corresponding to an abrasion of the monitoring electrode;

wherein the at least one monitoring electrode is designed as a selectively applied conductive layer system;

wherein the layer system comprises at least one conductive polymer layer and/or at least one metal layer and/or at least one doped semiconductor layer;

wherein the layer system comprises at least two electrically conductive layers, each having different materials.

2. The measuring device according to claim 1, wherein:

the at least two layers each have an electrical resistance; and the at least two layers are arranged such that the respective resistances decrease in the radial direction.

3. The measuring device according to claim 1, wherein:

the at least two layers each have a layer thickness; and the at least two layers are arranged such that the respective layer thicknesses increase in the radial direction.

4. The measuring device according to claim 1, wherein:

the at least two layers each have a hardness; and the at least two layers are arranged such that the respective hardnesses decrease in the radial direction.

5. The measuring device according to claim 1, wherein:

the layer system has at least one electrically insulating layer, which separates two electrically conductive layers of the at least two layers from one another.

6. A measuring device comprising:

a measuring pipe for conducting a flowable medium;

wherein the measuring pipe has an inner lateral surface;

wherein the inner lateral surface is designed to be electrically insulating;

at least one monitoring electrode;

wherein the at least one monitoring electrode is arranged on the electrically insulating portion of the inner lateral surface in a medium-contacting manner;

a measuring apparatus for determining a process property of the medium; and an abrasion detection device which is designed to determine at least one variable on the at least one monitoring electrode, said variable corresponding to an abrasion of the monitoring electrode;

wherein the abrasion detection device has a contacting arrangement for electrically contacting the monitoring electrode, including a first contacting means and a second contacting means;

wherein the abrasion detection device is designed to measure an impedance on the at least one monitoring electrode and to determine the at least one variable at least on the basis of the temporal change of the impedance;

wherein the contacting arrangement has a first contacting means and a second contacting means;

wherein the contacting arrangement has a third contacting means and a fourth contacting means;

wherein the third contacting means and the fourth contacting means are arranged in a circumferential direction of the measuring pipe between the first contacting means and the second contacting means;

wherein the abrasion detection device is designed to allow an electrical current to flow between the first contacting means and the second contacting means;

wherein the abrasion detection device is designed to measure an electrical voltage between the third contacting means and the fourth contacting means;

wherein the abrasion detection device is designed to determine a sheet resistance and to determine the at least one variable at least on the basis of the temporal change of the sheet resistance.

* * * * *